(12) United States Patent
Gukelberger et al.

(10) Patent No.: US 10,385,771 B2
(45) Date of Patent: Aug. 20, 2019

(54) CRANK PIN OFFSET IN DEDICATED EXHAUST GAS ENGINES

(71) Applicant: Southwest Research Institute, San Antonio, TX (US)

(72) Inventors: Raphael Gukelberger, San Antonio, TX (US); Steven H. Almaraz, Seguin, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 15/687,836

(22) Filed: Aug. 28, 2017

(65) Prior Publication Data

US 2019/0063311 A1     Feb. 28, 2019

(51) Int. Cl.

| | |
|---|---|
| *F02B 75/32* | (2006.01) |
| *F02M 26/43* | (2016.01) |
| *F16C 11/02* | (2006.01) |
| *F02B 47/08* | (2006.01) |
| *F02B 75/04* | (2006.01) |
| *F16C 3/08* | (2006.01) |

(52) U.S. Cl.
CPC .............. *F02B 75/32* (2013.01); *F02B 47/08* (2013.01); *F02B 75/048* (2013.01); *F02M 26/43* (2016.02); *F16C 3/08* (2013.01); *F16C 11/02* (2013.01)

(58) Field of Classification Search
CPC ......... F02B 75/32; F02B 47/08; F02M 26/43; F02M 26/00; F16C 11/02
USPC ...................................... 123/568.11; 701/108
See application file for complete search history.

(56) References Cited

U.S. PATENT DOCUMENTS

| | | | |
|---|---|---|---|
| 2,974,541 A | 3/1961 | Dolza | |
| 5,816,201 A | 10/1998 | Garvin | |
| 7,159,560 B2 | 1/2007 | Leduc et al. | |
| 7,231,906 B1 | 6/2007 | Haskara et al. | |
| 9,297,318 B2* | 3/2016 | Hayman | F16C 3/06 |
| 2012/0260894 A1 | 10/2012 | Hayman | |
| 2013/0199502 A1 | 8/2013 | Hayman | |
| 2013/0247714 A1* | 9/2013 | Hayman | F16C 3/06 74/596 |
| 2013/0247715 A1* | 9/2013 | Hayman | F16C 3/06 74/596 |
| 2014/0202433 A1* | 7/2014 | Dane | F02D 41/0065 123/568.11 |
| 2014/0360461 A1* | 12/2014 | Ulrey | F02M 26/43 123/299 |
| 2016/0047341 A1 | 2/2016 | Styles et al. | |

(Continued)

*Primary Examiner* — Mahmoud Gimie
(74) *Attorney, Agent, or Firm* — Grossman, Tucker et al

(57) ABSTRACT

A four stroke internal combustion engine with dedicated exhaust gas recirculation and method of operating such engine, wherein the engine comprises a plurality of combustion cylinders including main cylinders and a dedicated exhaust gas recirculation cylinder, wherein each cylinder includes a piston; a crankshaft, which is rotatable in a direction, and defines a main crankshaft axis, and includes a plurality of crankpins. Each of the crankpins is coupled to at least one of the pistons. The crankpins affixed to the pistons of the main cylinders are spaced at an interval around the main crankshaft axis. The crankpin affixed to the piston of the dedicated exhaust gas recirculation cylinder is spaced at an offset of 5 to 50 degrees from the interval in either direction relative to the direction of crankshaft rotation.

14 Claims, 18 Drawing Sheets

(56) References Cited

U.S. PATENT DOCUMENTS

2016/0061105 A1\* 3/2016 Shen .................... F02B 75/048
   123/48 B

\* cited by examiner

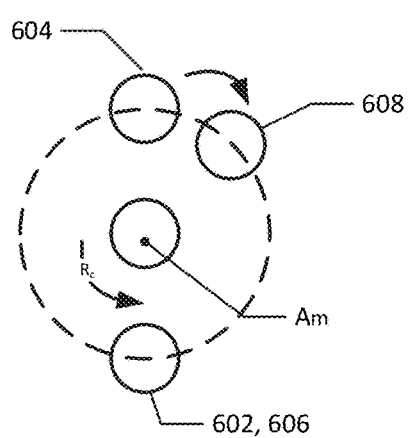 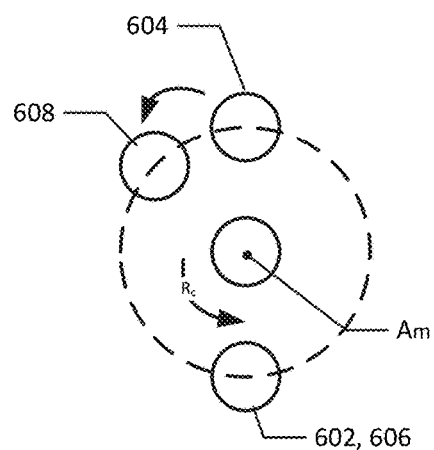
*FIG. 6a*        *FIG. 6b*

CRANK PIN OFFSET IN DEDICATED EXHAUST GAS ENGINES

FIELD

The present disclosure is directed to the use of one or more crank pin offsets in a dedicated exhaust gas engine.

BACKGROUND

Exhaust gas recirculation systems recirculate at least a portion of the gas exhausted generated by an internal combustion engine back into the engine. For certain conventional exhaust gas recirculation (EGR) systems, exhaust gas expelled from all of the cylinders of an internal combustion engine may be collected in an exhaust manifold. A fraction of the collected exhaust gas (e.g. 5% to 10%) may then be routed from the exhaust manifold through a control valve back to an intake manifold of the engine, where it may be introduced to a stream of fresh (ambient) intake air. The remaining fraction of exhaust gas in the exhaust manifold, rather than being recirculated and recycled, generally flows to a catalytic converter of the exhaust system and, after treatment therein, may be expelled to the atmosphere through the exhaust pipe.

EGR has a history of use in gasoline spark-ignition engines, and affects combustion in several ways. First, the combustion in the cylinders of the engine may be cooled by the presence of exhaust gas. That is, the recirculated exhaust gas may absorb heat from the combustion. Furthermore, the dilution of the oxygen present in the combustion chamber with the exhaust gas, in combination with the cooler combustion, may reduce the production of mono-nitrogen oxides (NOx), such as nitric oxide (NO) and nitrogen dioxide ($NO_2$). Additionally, EGR may reduce the need for fuel enrichment at high loads in turbocharged engines and thereby improve fuel economy.

EGR, which uses higher levels of exhaust gas, may further increase fuel efficiency and reduce emissions of spark-ignition engines. However, with higher levels of exhaust gas, engines may face challenges related to EGR tolerance, which may reduce the expected fuel efficiency improvement. Challenges related to EGR tolerance may be understood to include increasing an engine's ability to process higher levels of exhaust gas without adversely affecting performance, particularly fuel economy. Thus, even if EGR tolerance may be satisfactory for engine operation at low levels of EGR, an engine may need additional modifications in structure and operational conditions to accommodate higher levels of EGR without adversely affecting engine performance.

More recently, an engine configuration has been proposed with one or more cylinders of the engine being dedicated to expelling exhaust gas for EGR, which is then directed to the intake manifold. Such cylinders may be referred to as dedicated EGR, or D-EGR, cylinders. Dedicated EGR cylinder(s) may operate at a broad range of equivalence ratios since their exhaust gas is generally not configured to exit the engine before flowing through a cylinder operating at, for example, a stoichiometric or near stoichiometric air/fuel ratio, at stoichiometric there is a correct amount of air and fuel such that, after combustion, all the fuel is burned and there is no excess air present. This may allow the dedicated EGR cylinder to be operated fuel rich to produce higher levels of hydrogen ($H_2$) gas and carbon monoxide (CO) gas and which, may in turn, increase the octane number and promote increased EGR tolerance and knock tolerance by increasing flame/speed burn rates, as well as increasing the dilution limits of the mixture and associated combustion stability of all the cylinders. If the main cylinders are operated at an equivalence ratio of 1.0, stoichiometric exhaust leaves the engine and a conventional three way catalyst can be used to reduce pollutant emission.

There are a number of air intake and exhaust gas recirculation configurations for dedicated exhaust systems. For example, in some embodiments, recirculated exhaust gas may be intermixed with the intake air and supplied to all of the combustion cylinders, including the dedicated exhaust gas cylinder. In other embodiments, the dedicated exhaust gas cylinder may receive only ambient air from the air intake and the remainder of the cylinders (i.e. the main cylinders) may receive recirculated exhaust gas intermixed with intake air.

Due to the different air intake and exhaust gas recirculation loop configurations of dedicated exhaust gas recirculation (D-EGR) engines and the rich operating strategy, wherein the air to fuel ratio of the D-EGR cylinder may be in the range of 14.0 to 6, combustion behavior can vary significantly between the D-EGR cylinder(s) and the main cylinder, which may run at an air to fuel ratio in the range of 9 to 25. At part load or other stability limited conditions, where e.g., the break mean effective pressure may be in the range of 0 to 10 bar, the coefficient of variation of the indicated mean effective pressure is greater than 3 to 5%, or knock intensity is greater than 0.3 to 1.5 depending on engine configuration, the additional fuel dilution can cause unstable dedicated exhaust gas recirculation operation. At high loads or other knock limited conditions, the additional fuel dilution decreases the combustion temperatures and typically improves the knock resistance of the D-EGR cylinder(s) over the main cylinders. To balance the indicated mean effective pressure (IMEP) and torque fluctuations across all cylinders, individual spark timing, start of injection, valve timing and other methodologies that affect volumetric efficiencies (VE) of each cylinder, i.e., individual volumetric efficiencies, can be employed. The methodologies that enable indicated mean effective pressure balancing of the cylinders include, but are not limited to, individually dedicated exhaust gas recirculation cylinder(s) cam phasing and variable valve lift, a separate dedicated exhaust gas recirculation cylinder(s) intake port throttle, and a separate dedicated exhaust gas recirculation cylinder(s) exhaust port throttle.

SUMMARY

An aspect of the present disclosure relates to a four stroke internal combustion engine with dedicated exhaust gas recirculation. The engine includes a plurality of combustion cylinders including at least two main cylinders and a dedicated exhaust gas recirculation cylinder, wherein each cylinder includes a piston. The engine also includes a crankshaft, which is rotatable in a direction and defines a main crankshaft axis. The crankshaft includes a plurality of crankpins and each of the crankpins is coupled to at least one of the pistons, and a) the crankpins affixed to the pistons of the main cylinders are spaced at an interval around the main crankshaft axis, and b) the crankpin affixed to the piston of the dedicated exhaust gas recirculation cylinder is spaced at an offset of 5 to 50 degrees from the interval in either direction relative to the direction of crankshaft rotation around the main crankshaft axis.

Another aspect of the present disclosure relates to a method of operating a four stroke internal combustion engine dedicated exhaust gas recirculation. The method includes combusting a fuel-air mixture in a four-stroke internal combustion engine and rotating a crankshaft and crankpins. The engine includes a plurality of combustion cylinders including at least two main cylinders and a dedicated exhaust gas recirculation cylinder, wherein each cylinder includes a piston. The engine also includes the crankshaft, which is rotatable in a direction and defines a main crankshaft axis. The crankshaft includes a plurality of crankpins and each of the crankpins is coupled to at least one of the pistons, and a) the crankpins affixed to the pistons of the main cylinders are spaced at an interval around the main crankshaft axis, and b) the crankpin affixed to the piston of the dedicated exhaust gas recirculation cylinder is spaced at an offset of 5 to 50 degrees from the interval in either direction relative to the direction of crankshaft rotation around the main crankshaft axis.

In yet a further aspect, the present disclosure is directed to an adjustable crankpin mechanism. The mechanism includes a crankshaft web, a channel defined within the crankshaft web, and a slot defined by the edges of the channel; a crankpin including a lip. The crankpin extends from said slot and is slidably retained by said channel. Further, an actuator is operatively coupled to the crankpin.

BRIEF DESCRIPTION OF THE DRAWINGS

The above-mentioned and other features of this invention and the manner of attaining them will become more apparent with reference to the following description of embodiments herein taking in conjunction with the accompanying drawings, wherein:

FIG. 6a is an illustration of advanced crankpin offset of the crankpin associated with the dedicated exhaust gas cylinder from the interval in the direction of crankshaft rotation;

FIG. 6b is an illustration of lagging crankpin offset of the crankpin associated with the dedicated exhaust gas cylinder from the interval in the direction of crankshaft rotation;

DETAILED DESCRIPTION

The present disclosure is directed to the use of one or more variable crank pin offsets in a dedicated exhaust gas, four-stroke engine. The crankpin offset allows for the independent alteration of the volumetric efficiency of the dedicated exhaust gas cylinders, which then allows for the modification of the exhaust gas rate, combustion stability, and indicated mean effective pressure. In particular, the crankpin offset may be used to vary the exhaust gas recirculation rate and to balance indicated mean effective pressure across the cylinders (both main and dedicated exhaust cylinders) in the engine. Valve timing and valve lift control strategies have been used to independently alter exhaust gas rate, combustion stability, and indicated mean effective pressure of the dedicated exhaust gas recirculation cylinders. However, valve timing and lift control strategies may only be implemented to a certain degree and there are some circumstances which may require fully independent dedicated exhaust gas recirculation cylinder valve actuation. The crankshaft pin offset mechanism may be utilized alone or in addition to these strategies and fully independent systems to better control exhaust gas rate, combustion stability, and indicated mean effective pressure.

Figure 1:
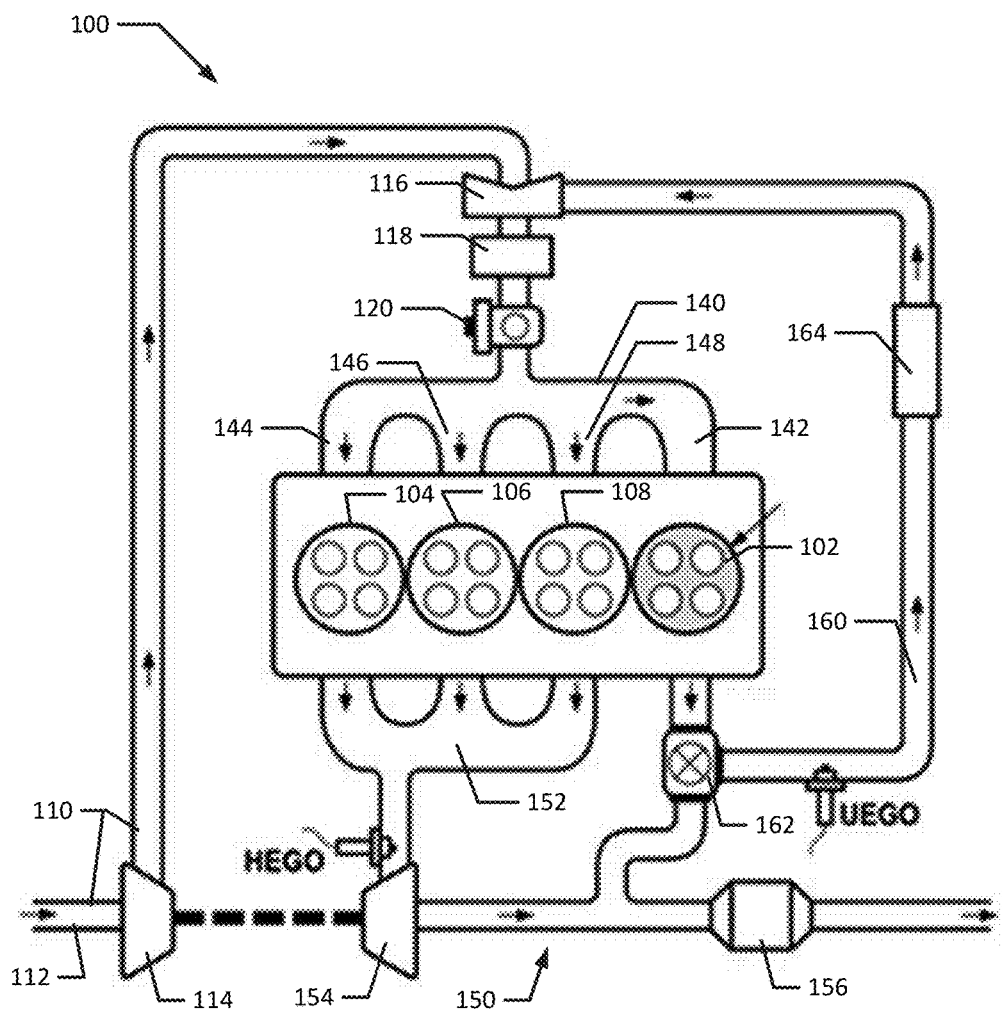
FIG. 1 is an embodiment of an exhaust gas recirculation system configuration.

FIG. 1 illustrates an embodiment of a dedicated exhaust gas recirculation engine for use herein including a dedicated exhaust gas system. The engine 100 includes a dedicated exhaust gas recirculation cylinder 102 and three main cylinders 104, 106, 108. Ambient air is provided to the engine through an air intake pathway 110, which includes an air inlet 112 and a compressor 114, which is optional. The air flows through the pathway 110 into a mixer 116, where it is mixed with recirculated exhaust gas from the exhaust gas recirculation loop 160. An intercooler 118 is positioned between the mixer 116 and the main throttle 120; use of an intercooler is optional. Air, mixed with exhaust gas, is then introduced into the intake manifold 140. The intake manifold 140 includes a number of runners 142, 144, 146, 148, which directs the air into the main engine cylinder 102, 104, 106, 108.

After combustion, exhaust gas is directed out the main cylinders and into the exhaust system 150 through an exhaust manifold 152. Exhaust gas leaving the exhaust manifold 150 drives a turbine 154 associated with the compressor 114 and is treated by an exhaust gas treatment system, such as a three way catalyst 156 or other exhaust after treatment systems. All or a portion of the exhaust gas leaving the dedicated exhaust gas recirculation cylinder 102 is routed through an exhaust gas recirculation loop 160 by a valve, such as the illustrated three-way valve 162. The remainder of the exhaust gas from the dedicated exhaust gas recirculation cylinder 102 is routed into the exhaust system 150. Exhaust gas passing through the exhaust gas recirculation loop 160 may be treated by a catalyst, such as a water gas shift catalyst, a steam reformer, or both. Further, the recirculated exhaust gas is passed through an exhaust gas recirculation cooler 164, which is optional. As noted above, the exhaust gas is introduced into the intake air stream through mixer 116.

Figure 2:
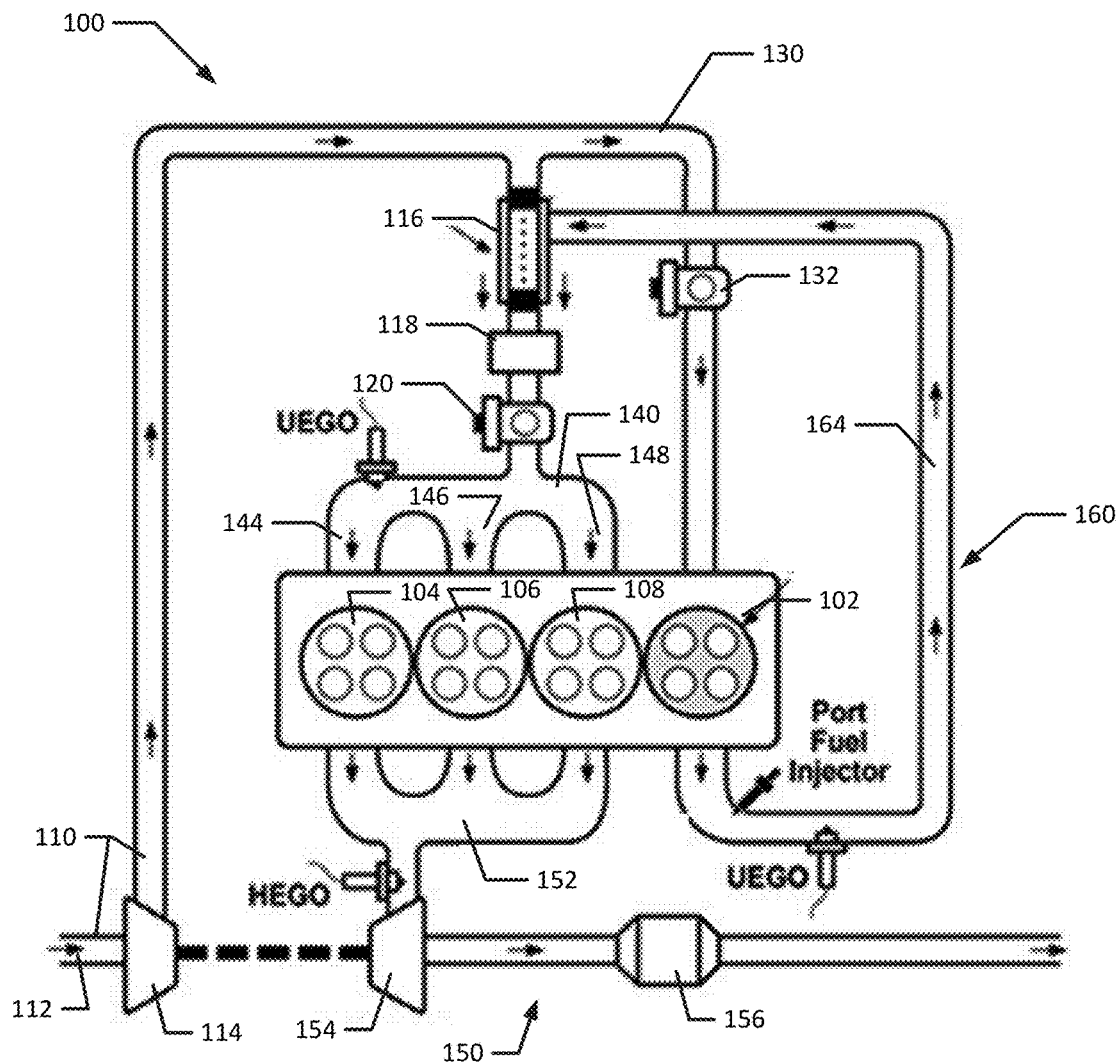
FIG. 2 is another embodiment of an exhaust gas recirculation system configuration.

FIG. 2 illustrates a second embodiment of a dedicated exhaust gas recirculation engine for use herein, wherein the dedicated exhaust gas system receives air that is not mixed with recirculated exhaust gas. The engine 100 includes a dedicated exhaust gas recirculation cylinder 102 and three main cylinders 104, 106, 108. Ambient air is provided to the engine through an air intake pathway 110, which includes an air inlet 112 and a compressor 114, which may be optional in the case of naturally aspirated engines. A portion of the air flows through the pathway 110 into a mixer 116, where it is mixed with recirculated exhaust gas from the exhaust gas recirculation loop 160. An intercooler 118 is positioned between the mixer 116 and the main throttle 120; use of an intercooler is optional. Air, mixed with exhaust gas, is then introduced into the intake manifold 140. The intake manifold 140 includes a number of runners 144, 146, 148, which directs the air into the engine cylinders 104, 106, 108. The other portion of air from the air intake pathway 110 flows through a secondary air inlet pathway 130, through a second main throttle 132, and into the dedicated exhaust gas recirculation cylinder 102.

After combustion, exhaust gas is directed out the main cylinders and into the exhaust system 150 through an exhaust manifold 152. Exhaust gas leaving the exhaust manifold 150 drives a turbine 154 associated with the compressor 114 and is treated by an exhaust gas treatment system, such as a three way catalyst 156. Exhaust gas leaving the dedicated exhaust gas recirculation cylinder 102 is routed through an exhaust gas recirculation loop 160. Exhaust gas passing through the exhaust gas recirculation loop 160 may be treated by a catalyst or a steam reformer as well as an exhaust gas recirculation cooler. As noted above, the exhaust gas is introduced into the intake air stream through mixer 116.

It may be appreciated that a number of other air intake and exhaust gas recirculation configurations are available incorporating one or more features of the systems described above. Furthermore, while four cylinder engines are depicted herein, including 3 main cylinders and 1 dedicated exhaust gas recirculation cylinder, anywhere between 2 and 12 cylinders may be employed in a single engine block, wherein the ratio of main cylinders to dedicated exhaust gas recirculation cylinders may be in the range of 1:1 to 5:1. In addition, while a number of the examples below discuss the use of an "in-line" engine, where all of the cylinders are arranged in a line and oriented in the same direction along the line, other engine configurations may be used as well, such as a V-engine where the cylinders are arranged in two "V"-shaped banks set at an angle of, e.g., 60 or 90 degrees, a VR-engine, similar to a V-engine except the two banks are relatively closer together, or an opposed engine where the cylinders are arranged in two banks oriented in opposing directed to each other.

Figure 3:
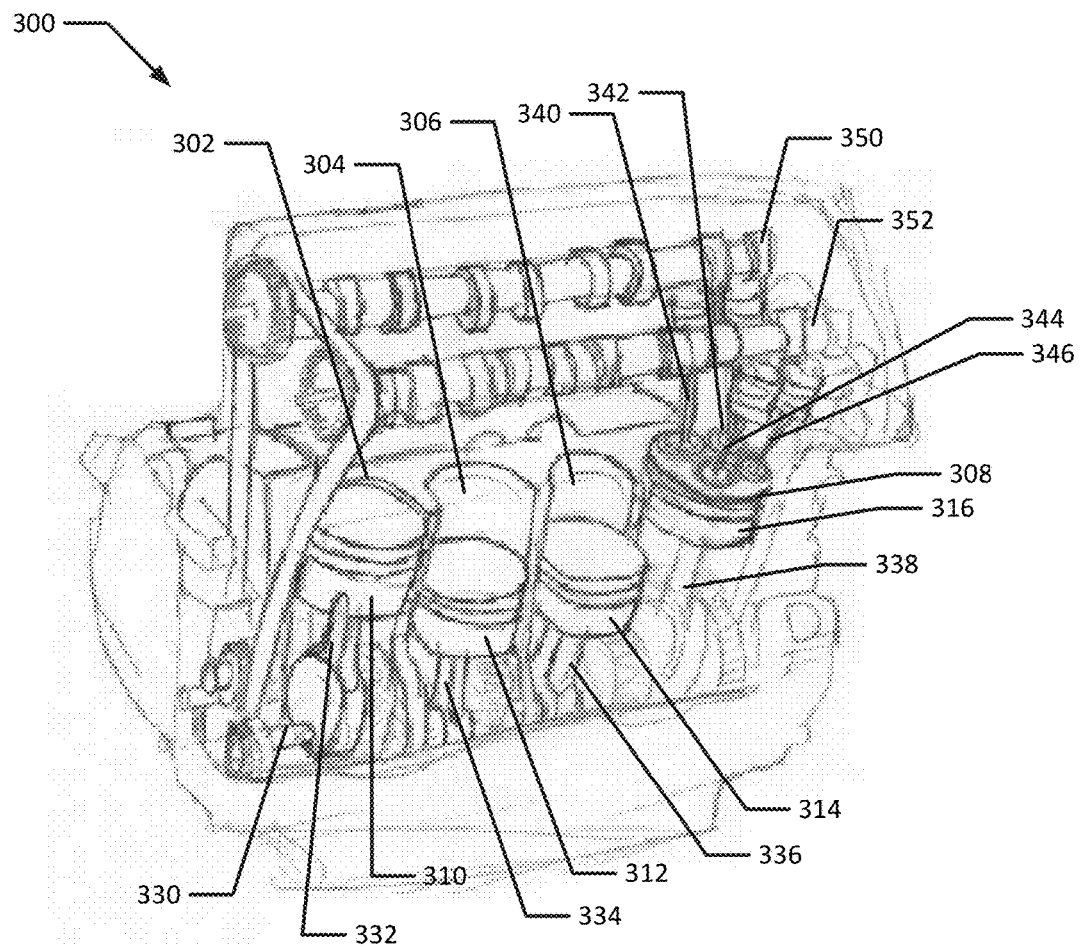
FIG. 3 is an illustration of an embodiment of a V-engine, with a cut away to illustrate the piston in the combustion cylinders.

For example, FIG. 3 illustrates a cut-away of a V-engine 300. The cylinders 302, 304, 306, 308 each include a piston 310, 312, 314, 316. The pistons are coupled to a crankshaft 330 via a number of connecting rods 332, 334, 336, 338. For purposes of illustration, the figure only shows one set of intake and exhaust valves 340, 342, 344, 346; however, each piston includes a set of valves. Furthermore, as illustrated, the valves are actuated by dual overhead cam shafts 350, 352 driven by the crankshaft 330. However, other valve actuation mechanisms may alternatively be utilized, such as push-rod assemblies or single overhead cam shafts.

Figure 4:
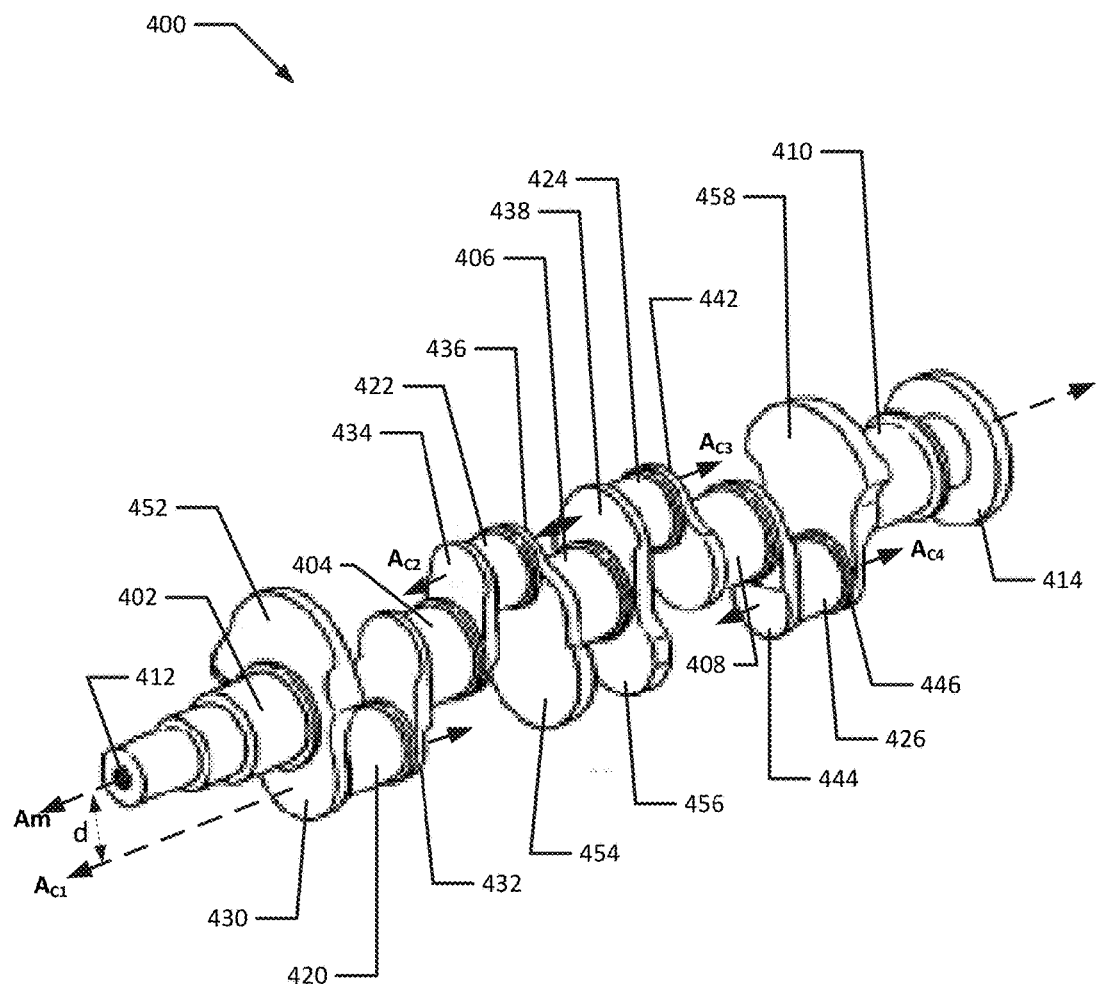
FIG. 4 is an illustration of an embodiment of a crankshaft.

FIG. 4 illustrates a perspective view of an embodiment of crankshaft 400. The crankshaft 400 includes main journals 402, 404, 406, 408, 410, which are typically rotatably captured by the crankcase. That is, the main journals support the crankshaft in the crankcase and rotate relative to the crankcase. While five main journals are illustrated, there may be two or more main journals depending on the number of cylinders and engine arrangement, such as in the range of 2 to 11, and more preferably in the range of 2 to 7. The main journals 402, 404, 406, 408, 410 are coaxial and define the main axis of the crankshaft $A_m$, which passes from end 412 to end 414 of the crankshaft and is centrally located relative to the main journal. A number of crankpins 420, 422, 424, 426 are provided, which are spaced around the main crankshaft axis. Each crankpin defines a crankpin axis $A_{c1}$, $A_{c2}$, $A_{c3}$, $A_{c4}$ that passes through the center of the crankpin. The big end of each connecting rod 332, 334, 336, 338 (see FIG. 3) is mounted to the crankpins 420, 422, 424, 426. The crankpins 420, 422, 424, 426 are carried by webs 430, 432, 434, 436, 438, 442, 444, 446, which are mounted at either end of the crankpins and extend from the main crankshaft journals. Further, counterweights 452, 454, 456, 458 may be provided. The counterweights 452, 454, 456, 458 are a part of the webs and may radially align with or oppose the crankpin that it is associated with relative to the main crankshaft axis $A_m$. As illustrated, counter weight 452 extends in a radially opposing direction from crankpin 420, counter weight 454 extends in a radially opposing direction from crankpin 422. The distance between each center axis of the crankpins $A_{c1}$, $A_{c2}$, $A_{c3}$, $A_{c4}$ extend form the main axis $A_m$ is understood herein as the crankpin throw.

Generally, it is desirable if the center of gravity of the crankshaft lies at the center point of the crankshaft, e.g., along the crankshaft's main axis. In addition, the crankpins are spaced at intervals I around the main axis of the crankshaft. In some cases the intervals I are even, wherein a complete engine cycle (or 720 degrees of crank angle rotation) is divided by the number of cylinders to obtain the crankpin spacing. For instance, an inline 4-cylinder engine will have crankpins for every 180 degrees of crank angle rotation and an inline 6-cylinder engine will have a crankpin for every 120 degrees of crank angle rotation. However, there are also odd-fire engines, such as odd-fire V4, V6 or V10 engines, wherein the intervals are not even. In these cases the intervals I are alternating or "odd firing" intervals. Particularly in the case of "odd firing" intervals, the spacing may also be affected by the configuration of the engine, such as the degree of cylinder bank offset. Reference to intervals herein may be understood as reference to either even intervals or "odd firing" intervals, unless noted otherwise.

Figure 5A:
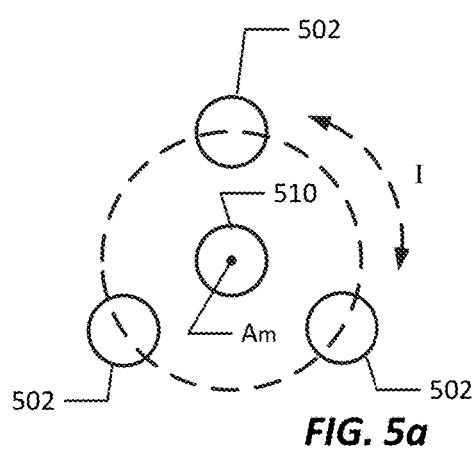
FIG. 5a is an illustration of an embodiment of crankpin spacing of a six cylinder (or three cylinder) engine.
Figure 5B:
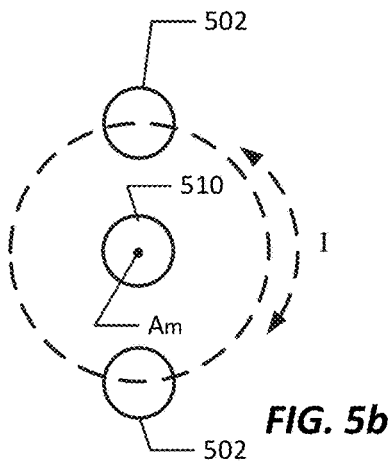
FIG. 5b is an illustration of an embodiment of crankpin spacing intervals of a four cylinder (or two cylinder) engine.
Figure 5C:
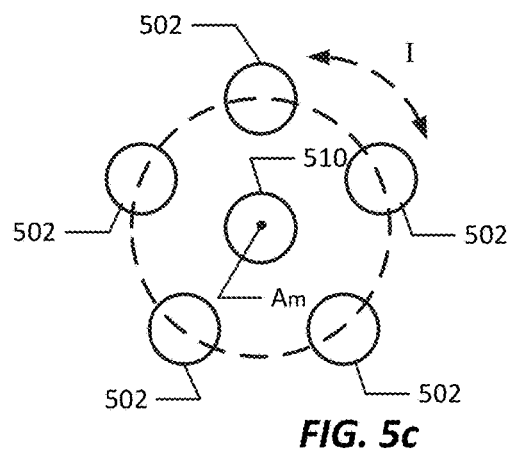
FIG. 5c is an illustration of an embodiment of crankpin spacing intervals of a five cylinder engine.
Figure 5D:
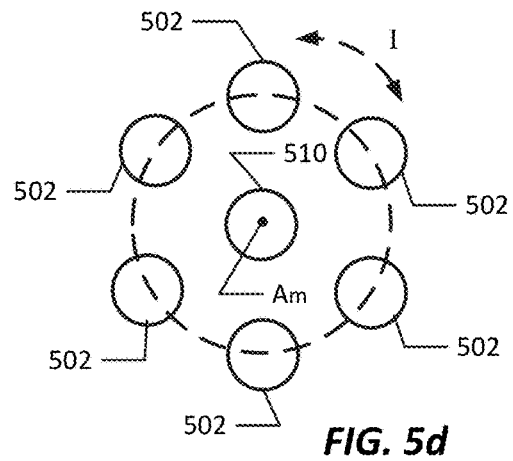
FIG. 5d is an illustration of an embodiment of crankpin spacing intervals of a six cylinder engine.
Figure 5E:
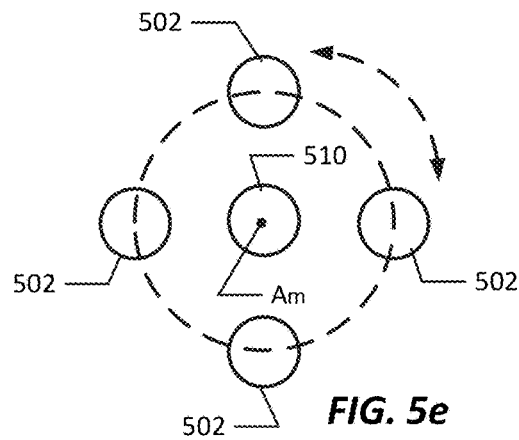
FIG. 5e is an illustration of an embodiment of crankpin spacing intervals of an eight cylinder engine.

FIGS. 5a through 5e illustrate embodiments of the crankpin spacing around the main crankpin axis $A_m$ in engines using even firing intervals. FIG. 5a illustrates an embodiment of spacing of the crankpins in a six cylinder (or three cylinder) engine, where the crankpins are spaced at intervals I of 120 degrees (or 240 degrees for a three cylinder) of crankshaft rotation. FIG. 5b illustrates an embodiment of spacing of the crankpins in a four cylinder engine, where the crankpins are spaced at intervals I of 180 degrees of crankshaft rotation. FIG. 5c illustrates an embodiment of spacing of the crankpins in a five cylinder engine, where the crankpins are spaced at intervals I of 144 degrees of crankshaft rotation, FIG. 5d illustrates another embodiment of spacing of the crankpins in a six cylinder (or twelve cylinder) engine, where the crankpins are spaced at intervals I of 60 degrees of crankshaft rotation. FIG. 5e illustrates a further embodiment of spacing of the crankpins in an 8 cylinder engine, where the crankpins are spaced at intervals I of 90 degrees of crankshaft rotation.

As noted above, and odd firing intervals may be utilized as well. In one example, the intervals I are at 150 degrees and 90 degrees of crankshaft rotation in a V6 with 90 degree cylinder banks or, in another example, the intervals I are at 90 degrees and 54 degrees of crankshaft rotation in a V10 with 90 degree cylinder banks. Other even fire and odd intervals I for each engine are also feasible.

It should be appreciated that the intervals I are not necessarily created by spacing all of the adjoining cylinders relative to each other around the main crankshaft axis. For example, in a 4 cylinder inline engine or in a 4 cylinder boxer engine, the $1^{st}$ cylinder crankpin is spaced 180 degrees from the $2^{nd}$ cylinder crankpin around the main axis $A_m$ and the $3^{rd}$ cylinder crankpin is spaced 180 degrees from the $4^{th}$ cylinder crankpin around the main axis $A_m$. However, the $2^{nd}$ and $3^{rd}$ cylinder crankpins are spaced at 0 degrees from each other around the main axis $A_m$. In this embodiment, the crankpins of the four cylinders are understood to be spaced at 180 degree intervals and, when viewed from either end, the crankshaft indicates an interval I spacing of 180 degrees.

However, when running an engine with a dedicated exhaust gas recirculation cylinder using an exhaust gas recirculation system configuration, such as those illustrated in FIGS. 1 and 2, the combustion behavior may vary between the main cylinders and the dedicated exhaust gas cylinders as noted above. The operating conditions of the dedicated exhaust gas recirculation cylinder(s) may be operated at different air to fuel ratios, valve timing and ignition timing than the main cylinders. For example, in utilizing one or more dedicated exhaust gas recirculation cylinders (D-EGR cylinders), the D-EGR cylinders are often run rich at air to fuel ratios of 14 to 9.5 and less than stoichiometric, stoichiometric in the case of isooctane being 14.7:1, whereas the main cylinders are often run at air to fuel ratios of 14.7 to 24. In addition, the ignition timing for the dedicated exhaust gas recirculation cylinder may be in the range of −15 to +30 degrees of crank angle rotation relative to the main cylinder, depending on operating conditions, etc. If the dedicated exhaust gas recirculation cylinder has a valve timing adjustment, the ignition timing may range from −30 to +30 degrees of crank angle rotation relative to the main cylinder, compared to the main cylinders. Rich combustion, which increases $H_2$ production, tends to exhibit a relatively late peak pressure in the range of 10 to 50° aTDC (after top dead center) and preferably 10 to 16 degrees of crank angle rotation after top dead center. For example, when D-Phi is greater than 1.3 peak pressure may be exhibited at a crank angle in the range of, e.g., 5 to 10 degrees of crankshaft rotation later than the main cylinders. When D-Phi is greater than 1.6, peak pressure may be exhibited at a crank angle in the range of 15-50 degrees of crankshaft rotation later than the main cylinders. On the other hand, the stoichiometric combustion of the main cylinders tends to exhibit peak pressure preferably in the range of 10 to 16 degrees aTDC. D-Phi may be understood as the fuel-air equivalence ratio, which is the ratio of the fuel to oxidizer ratio to the stoichiometric fuel to oxidizer ratio as represented by the following equation.

$$\phi = \frac{\frac{m_{fuel}}{m_{oxidizer}}}{\left(\frac{m_{fuel}}{m_{oxidizer}}\right)st} = \frac{\frac{n_{fuel}}{n_{oxidizer}}}{\left(\frac{n_{fuel}}{n_{oxidizer}}\right)st},$$

wherein m is the mass and n is the number of moles and st stands for stoichiometric. In other embodiments, such as when the main cylinders are operated at lean combustion conditions, the dedicated exhaust gas recirculation cylinders may exhibit faster combustion than the main cylinders and earlier relative peak pressures than the main cylinders at 5-15 of crank angle rotation earlier than the main cylinders. The variation in peak pressure timing, or crank angle location, unbalances the forces acting on the crankshaft.

These factors may affect volumetric efficiencies, EGR rates, and indicated mean effective pressures in the cylinders. The volumetric efficiency may be understood as the ratio of the mass density of the air-fuel mixture drawn into the cylinder at atmospheric pressure (during the intake stroke) to the mass density of the same volume of air in the intake manifold. The exhaust gas recirculation rate is understood as the amount of recirculated exhaust gas relative to the total (diluted) charge air flow rate and can be defined on a volumetric or mass basis. Further, the indicated mean effective pressure is understood as the average pressure produced in the combustion chamber during the operating cycle.

While the above may be addressed to some degree by adjusting valve timing, valve lift control strategies, and ignition timing, only so much adjustment can be affected with these strategies. Varying the location of the crankpin by offsetting the crankpins associated with the dedicated exhaust gas recirculation cylinder(s) also effects volumetric efficiencies, EGR rates, and indicated mean effective pressures in the cylinders and may be used alone or in addition to valve timing and ignition timing strategies. The location of the crankpin associated with the dedicated exhaust gas recirculation cylinder may be adjusted in either direction around the main crankshaft axis $A_m$ from the interval (either the even interval or "odd fire" interval, depending on the engine), and preferably in the range of 5 to 50 degrees, and more preferably in the range of 10 degrees to 40 degrees in either direction around the main crankshaft axis $A_m$. In the case of a four cylinder engine, where two of the crankpins are normally spaced at intervals of 180 degree from the other two crankpins, the crankpin(s) associated with a dedicated exhaust gas recirculation cylinder is offset, such as in the range of 5 to 50 degrees from the interval, in either direction relative to the direction of crankshaft rotation.

FIGS. 6a and 6b illustrate an embodiment of a four (4) cylinder inline engine or boxer engine crankshaft configuration including variable crankpin offsets. The figures illustrate interval I spacing, based on four cylinders in total (incl. main cylinders and dedicated exhaust gas cylinder(s), between the crankpins 602, 604, 606 associated with the main cylinders and an offset of the D-EGR cylinder crankpin 608 in either direction from the interval around the main crankshaft axis $A_m$. FIG. 6a illustrates a positive offset of the crankpin 608 in the direction of crankshaft rotation in the range of 5 to 50 degrees from the interval. In this embodiment, the crankpin offset provides advancement in crankpin rotation $R_c$ relative to the interval and decreases the firing spacing between the cylinder of the previous combustion and the advanced D-EGR cylinder firing event. FIG. 6b illustrates a negative offset of the crankpin in the direction of crankshaft rotation in the range of 5 to 50 degrees from the interval of the crankpins. In this embodiment, the crankpin offset provides a lag in crankpin rotation $R_c$ relative to the other crankpins and increases the firing spacing between the D-EGR cylinder and the previously fired cylinder. Thus, the interval spacing is understood to be determined by the total number of cylinders (main cylinders and dedicated exhaust gas cylinders) and the configuration of the engine. And, the offset may preferably be in the range of 5 degrees to 50 degrees from the interval spacing in either direction around the main axis $A_m$.

Figure 7A:
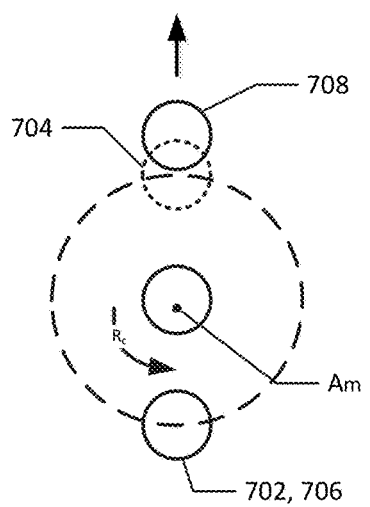
FIG. 7a is an illustration of radial spacing of a crankpin associated with a dedicated exhaust gas recirculation cylinder outward from the main crankshaft axis relative to the main cylinder crankpins.
Figure 7B:
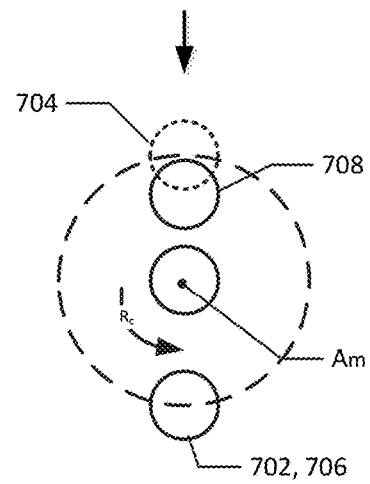
FIG. 7b is an illustration of radial spacing of a crankpin associated with a dedicated exhaust gas recirculation cylinder toward the main crankshaft axis relative to the main cylinder crankpins.

Further, in FIGS. 7a and 7b, the crankpins 708 associated with the dedicated exhaust recirculation cylinders may be radially adjusted towards or away from the main crankshaft axis $A_m$ as compared to the crankpins for the main cylinders 702, 704, 706. FIG. 7a illustrates the crankpin 708 associated with the dedicated exhaust recirculation cylinder radially spaced further away from the main crankshaft axis $A_m$ than the crankpins for the main cylinders 702, 704, 706. FIG. 7b illustrates the crankpin 708 associated with the dedicated exhaust recirculation cylinder radially spaced closer to the main crankshaft axis $A_m$ than the crankpins for the main cylinders 702, 704, 706. While the radial spacing is illustrated without the interval offsets described above, the radial spacing of the crankpins may be utilized in combination with the interval offsets.

In operation, as alluded to above, the engines herein are preferably, or limited to, four-stroke engines wherein all of the cylinders, i.e., main cylinders and dedicated-exhaust gas recirculation cylinders operate with a four-stroke cycle. The crankpins associated with the main cylinders are spaced around the main crankshaft axis $A_m$ at a number of intervals. The crankpins associated with the dedicated exhaust gas recirculation cylinders are offset by either a positive or negative 5 to 50 degrees from the interval spacing. In preferred embodiments, the main cylinders are operated at different air to fuel ratios from the dedicated exhaust gas recirculation cylinders. Further the spark timing of the dedicated exhaust gas recirculation cylinders is preferably different from the spark timing of the main cylinders, wherein the timing may be adjusted to obtain peak pressures as desired crank angles in the combustion cycle.

In preferred embodiments, the dedicated exhaust gas cylinder(s) is run rich as described above, exhibiting an air-fuel ratio in the range of 9.2 to 12, whereas the main cylinders may preferably run at stoichiometric or even relatively lean (with appropriate after treatment), exhibiting an air-fuel ratio in the range of 14.7 to 24. In such embodiments, the crankshaft pins associated with the dedicated exhaust gas cylinders are preferably advanced from 5 to 50 degrees from the interval of the crankpins, and preferably from 5 to 40 degrees from the interval of the crankpins, and more preferably from 5 to 20 degrees from the interval of the crankpins, including all values and ranges therein, wherein the interval is determined by the number of cylinders and the engine configuration. Further, in such embodiments, the dedicated exhaust gas cylinder utilizes a spark advance in the range of 5 to 60 degrees before top dead center (bTDC), including all values and ranges therein, whereas the main cylinders preferably utilize a spark advance in the range of −5 to 60 degrees before top dead center.

EXAMPLES

Figure 8:
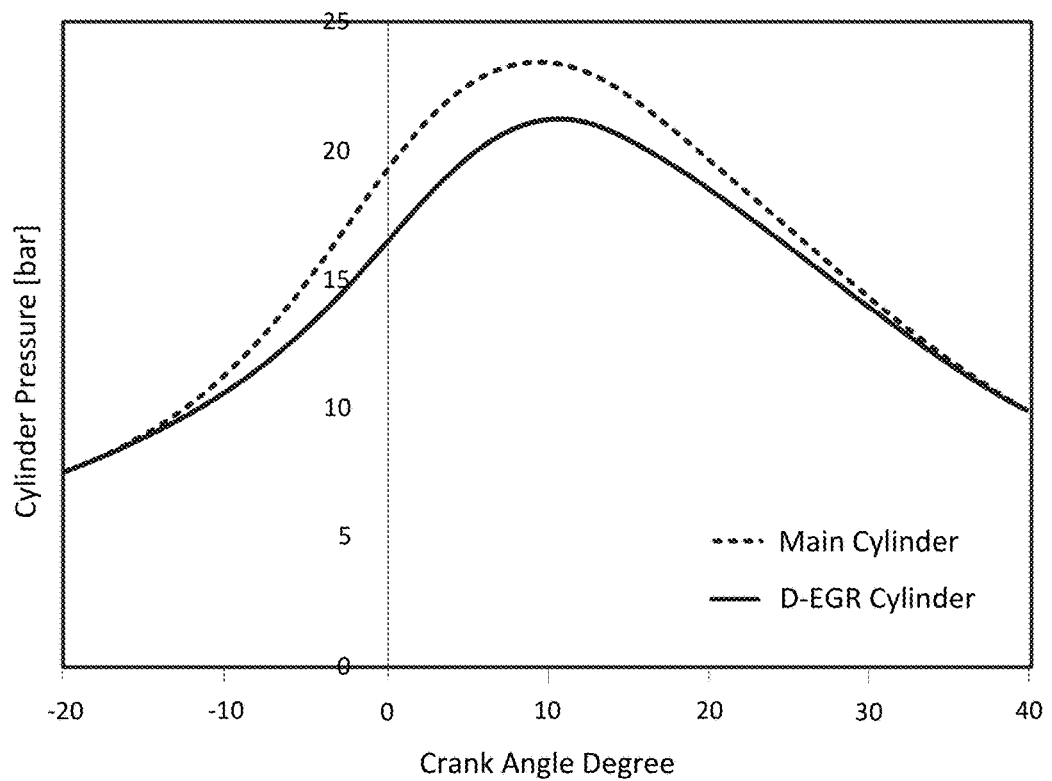
FIG. 8 illustrates the change in cylinder pressure at 2,000 rpm and 2 bar BMEP for the main and dedicated exhaust gas recirculation cylinders.

The graph provided in FIG. 8 illustrates the difference in the variation in cylinder pressure in an inline four (4) cylinder test engine running Tier II E0 certification gasoline for fuel at 2,000 rpm and at 2 bar of break mean effective pressure for both a main cylinder and a D-EGR cylinder. The brake mean effective pressure is understood as work accomplished during one engine cycle divided by the engine swept volume or the average pressure which, if imposed on the pistons uniformly from the top to the bottom of each power stroke, would produce the measured power output. The value is a theoretical value determined by the torque and volumetric displacement.

The D-EGR and main cylinders were run at an air to fuel ratio of 11 and 14.7 respectively. Further, the D-EGR cylinder utilized a spark advance (SA) of 60° bTDC (before top dead center) and the main cylinders utilized a spark advance of 60° bTDC. Earlier spark advance may cause increasing combustion instabilities due to relatively low compression temperatures and pressures at the time of spark and poor ignitability. Crankpin offset was not utilized. As can be seen in FIG. 8, the combustion phasing and location of peak pressure (LPP) of the D-EGR cylinder were retarded compared to the main cylinders, note that the LPP is an average of all the main cylinders. The delayed combustion phasing and decreased pressure leads to a decrease in engine efficiency, negatively impacts indicated mean effective pressure (IMEP) balancing, increases noise-vibration and harshness (NVH), and reduces combustion stability.

FIGS. 9 through 16 include graphs of crankshaft torque, piston pin axial forces, piston pin side forces, etc., generated using 1D simulations in GT_POWER engine simulation software available from Gamma Technologies of Westmont, Ill. Measurements without offset provide a baseline for comparison. To demonstrate the effect of advancement of the crankpin, the crankpin was offset in a positive direction relative to crankshaft rotation by 20 degrees, indicated as +20 degrees in the graphs, and 40 degrees, indicated as +40 degrees in the graphs. To demonstrate the effect of delay of the crankpin, the crankpin was offset in a negative direction relative to crankshaft rotation by 20 degrees, indicated as −20 degrees in the graphs, and 40 degrees, indicated as −40 degrees in the graphs. The simulations were performed at a constant engine torque of 70 Nm at 2,000 rpm, although it is expected the trends would remain similar at different torques.

Figure 9:
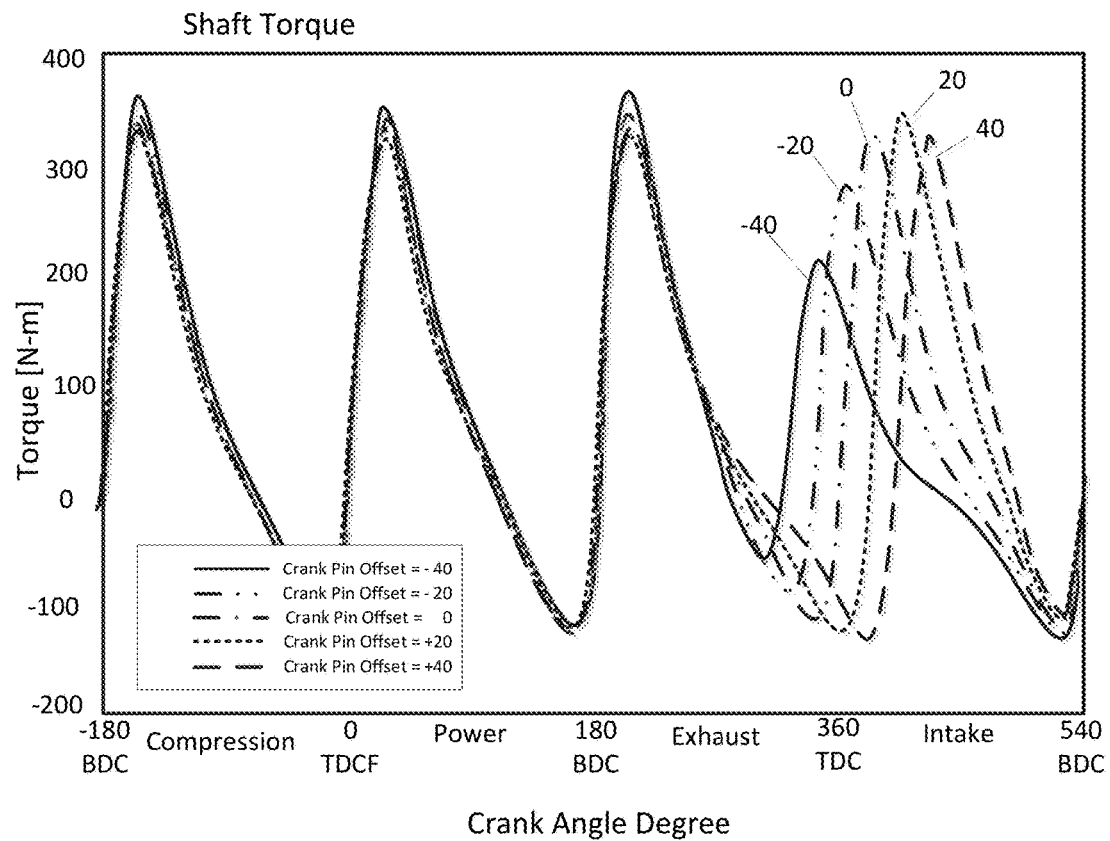
FIG. 9 illustrates the crankshaft torque for all cylinders with various dedicated exhaust gas recirculation cylinder crankpin offsets at constant engine torque of 70 Nm at 2000 rpm.

Turning to FIG. 9, illustrates the how the crankshaft torque for all of the cylinders, both the main cylinders and the dedicated exhaust gas recirculation cylinders, over a single engine cycle is lower than the baseline negative offsets and increases above the baseline at an offset of +20 degrees. The torque then drops again at +40 degrees to just below the baseline. Thus, a relatively more balanced engine may be achieved by appropriately offsetting the dedicated exhaust gas cylinder(s).

Figure 10:
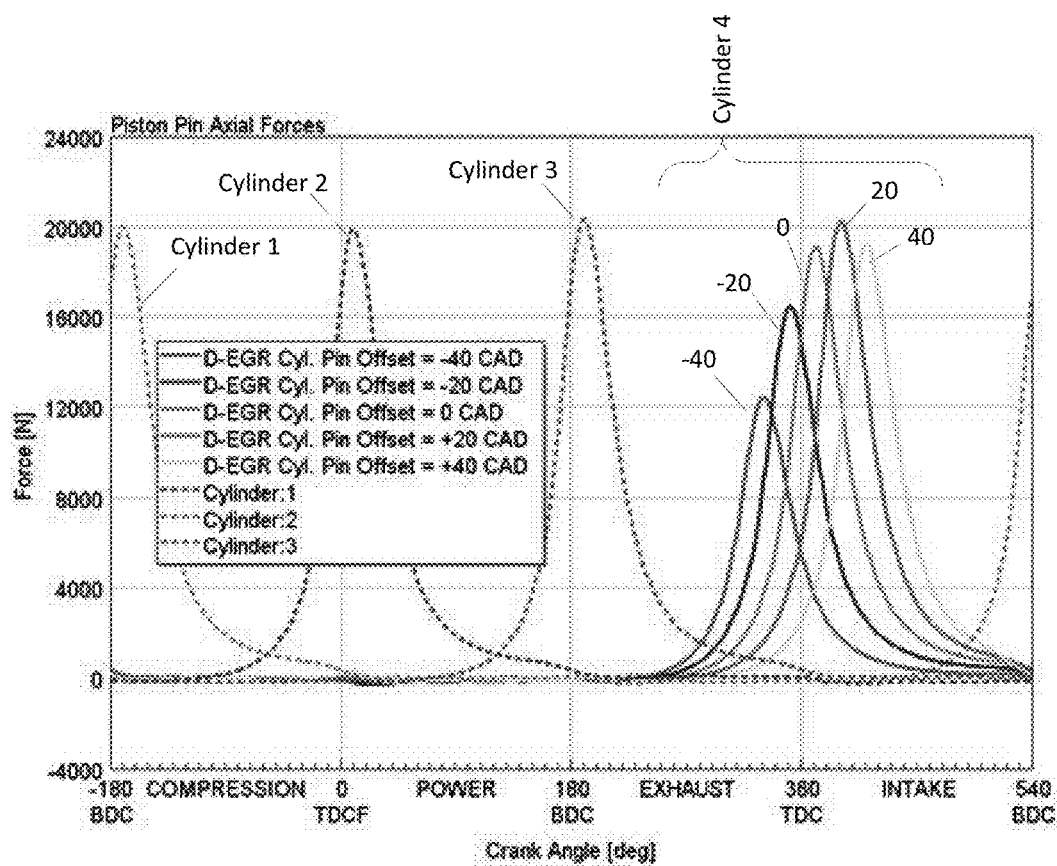
FIG. 10 illustrates piston pin axial forces of all cylinders with various dedicated exhaust gas recirculation cylinder crank pin offsets at constant engine torque of 70 Nm at 2000 rpm.

FIG. 10 illustrates piston pin axial forces for all cylinders with various dedicated exhaust gas recirculation crankpin offsets compared to the baseline, without offset, over a single engine cycle. As illustrated, the axial forces acting on the dedicated exhaust gas recirculation cylinder was highest at an offset of positive 20 degrees and lowest at negative 40 degrees. Interestingly, at an offset where the crankpin was advanced by 40 degrees resulted in similar forces as the baseline with no offset.

Figure 11:
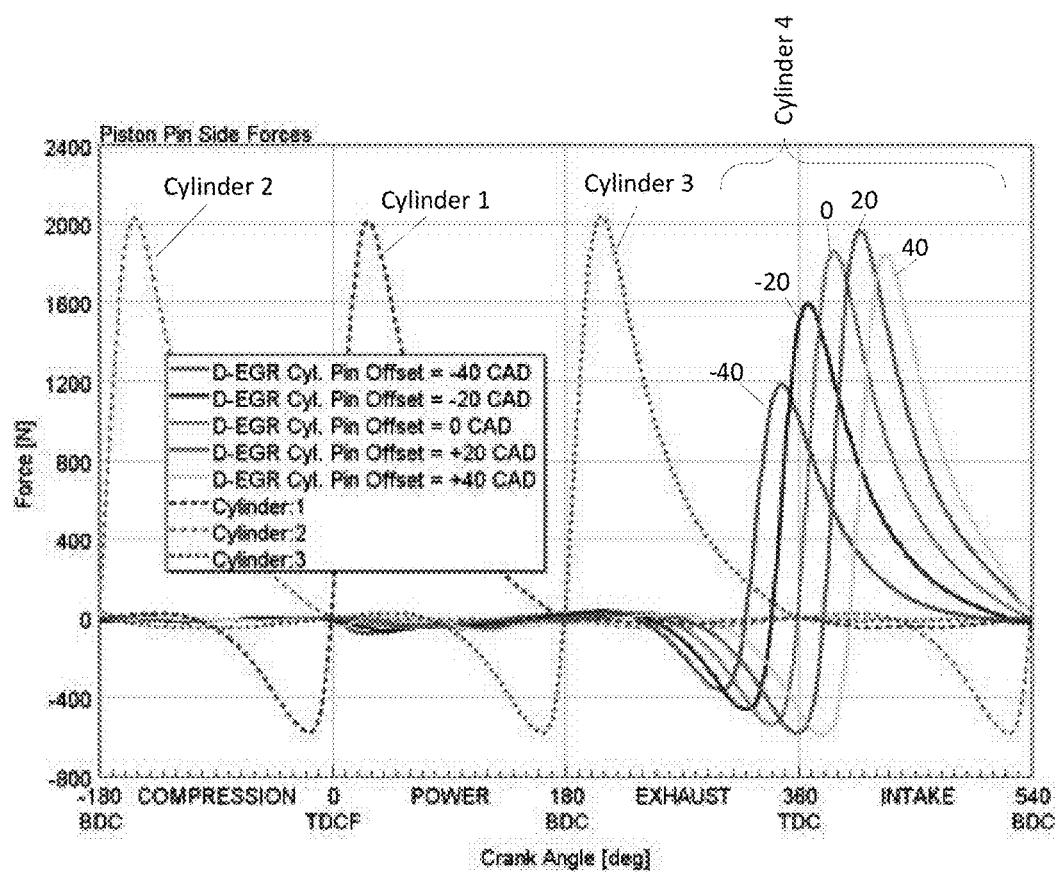
FIG. 11 illustrates piston pin side forces for all cylinders with various dedicated exhaust gas recirculation cylinder crank pin offsets at constant engine torque of 70 Nm at 2000 rpm.

FIG. 11 illustrates piston pin side forces, or thrust forces that act axially against the cylinder wall and change during the power and compression stroke for all cylinders with various dedicated exhaust gas recirculation crankpin offsets compared to the baseline, without offset, over a single engine cycle. As illustrated, the axial forces acting on the dedicated exhaust gas recirculation cylinder was highest at an offset of positive 20 degrees and lowest at negative 40 degrees. Interestingly, at an offset where the crankpin was advanced by 40 degrees resulted in similar forces as the baseline with no offset.

It was also found that offsetting the dedicated exhaust gas recirculation cylinder offset affects engine breathing if the valve train is not modified. When the dedicated exhaust gas recirculation cylinder crankpin is shifted earlier, and the valve opening and closing times are not individually adjusted, the result is nearly identical to a dedicated exhaust gas recirculation engine that has individual valve actuation control, where the exhaust valve is opened earlier and the intake valves are opened later. Vice versa, when the dedicated exhaust gas recirculation cylinder crankpin is offset to a delayed or negative condition, the dedicated exhaust gas recirculation cylinder will perform nearly the same as an earlier intake and exhaust valve opening.

Figure 12:
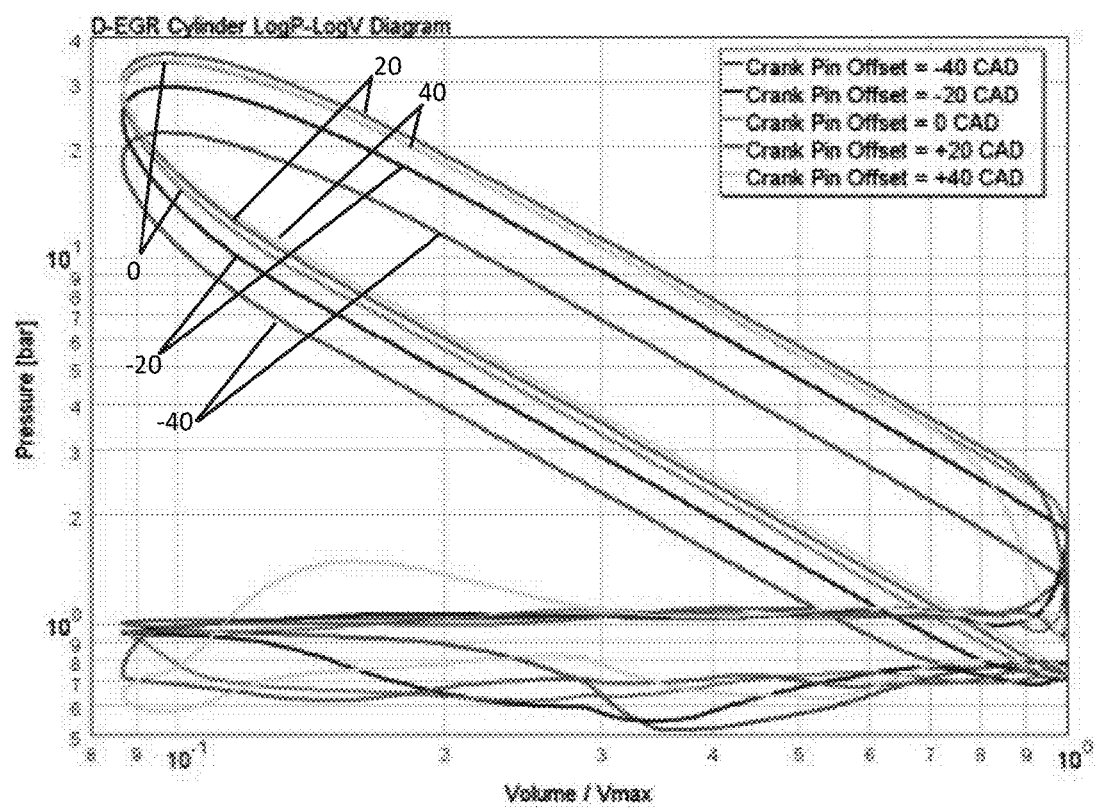
FIG. 12 illustrates P-V diagrams of the dedicated exhaust gas recirculation cylinder for various dedicated exhaust gas recirculation cylinder crank pin offsets.
Figure 13:
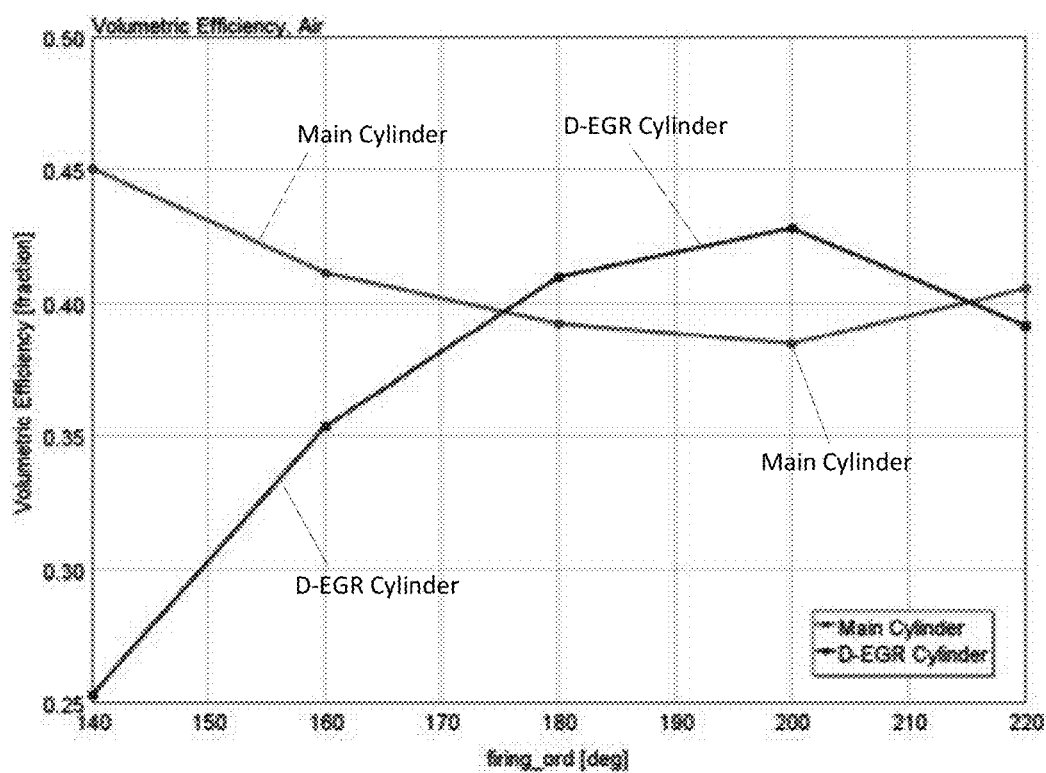
FIG. 13 illustrates the main and dedicated exhaust gas cylinder volumetric efficiencies for various dedicated exhaust gas recirculation cylinder crank pin offsets at constant engine torque of 70 Nm at 2000 rpm.
Figure 14:
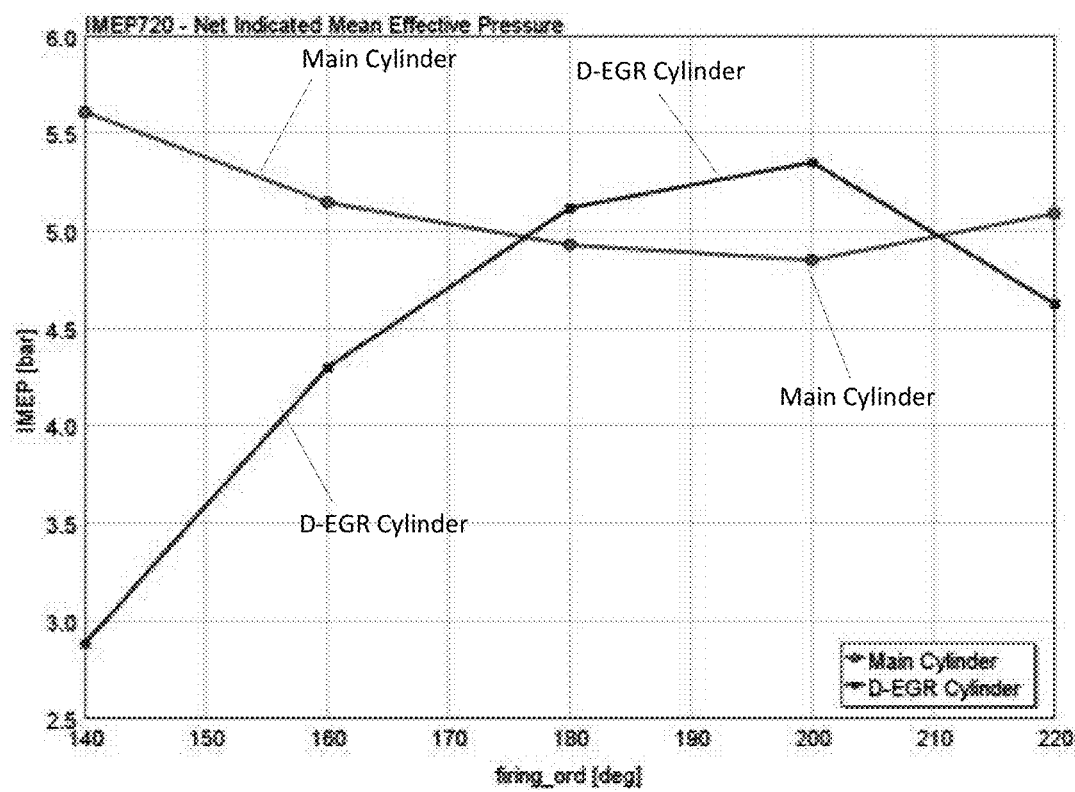
FIG. 14 illustrates the main and dedicated exhaust gas cylinder indicated mean effective pressures for various dedicated exhaust gas recirculation cylinder crank pin offsets at constant engine torque of 70 Nm at 2000 rpm.
Figure 15:
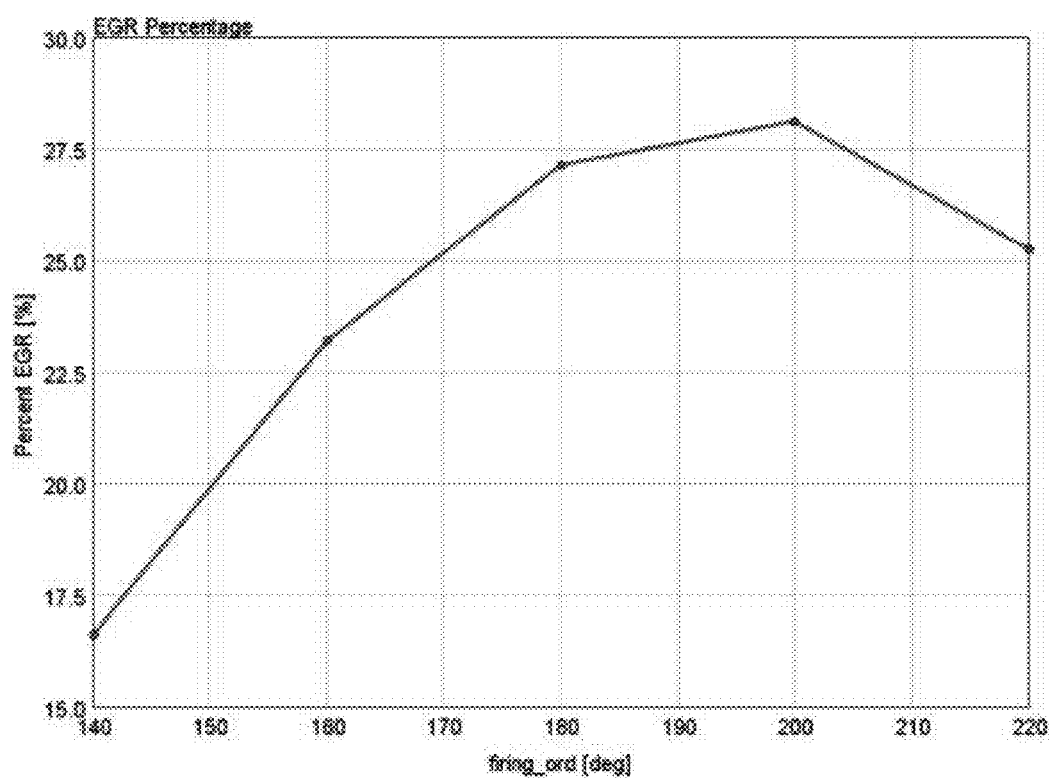
FIG. 15 illustrates the exhaust gas recirculation rate for various dedicated exhaust gas recirculation cylinder crank pin offsets at constant engine torque of 70 Nm at 2000 rpm.

This inevitable change in the dedicated exhaust gas recirculation specific valve timing, as a result of the dedicated exhaust gas recirculation crankpin offset, will impact the pumping work and indicated mean effective pressure. FIG. 12 shows various dedicated exhaust gas recirculation cylinder log P-log V diagrams for different crankpin offsets. The figure illustrates how changing the crankshaft pin offset affects the pumping loops and engine breathing. For example, the greater the advance in the crankpin offset of the dedicated exhaust gas recirculation cylinder, the higher the pressures compared to cylinder volume, whereas as the greater the negative offset, the lower the pressures compared to cylinder volume. As a result, the dedicated exhaust gas recirculation cylinder(s) volumetric efficiency and indicated mean effective pressure can be altered as shown in FIGS. 13 and 14, respectively. In these figures, the "firing_ord" x-axis represents the dedicated exhaust gas recirculation cylinder crankpin offset. A "firing_ord"=140 is representative of −40 crank angle degrees crankpin offset and "firing_ord"=220 is representative of a +40 crank angle degrees crankpin offset. At earlier crankpin offsets the volumetric efficiency and dedicated exhaust gas recirculation cylinder(s) indicated mean effective pressure were reduced compared to the baseline, without a crankpin offset. The change of volumetric efficiency, seen in FIG. 13, can be used to modulate the exhaust gas recirculation rate as shown in FIG. 15.

Providing crankpin offset is advantageous over non-offset configurations since a non-offset dedicated exhaust gas recirculation cylinder configuration will have a constant exhaust gas recirculation rate dependent on its design. In embodiments, the offset may be static, wherein the crankshaft is provided to exhibit a specific offset. Or, alternatively, the offset may be provided dynamically using a crankpin offset mechanism in the crankshaft webs holding the crankpins. Offset of the crankpin may be achieved by means of hydraulic, electronic, mechanical or pneumatic systems, which vary liquid or gas pressure supplied either side of the connecting rod pin to shift the pin in a slot machined in the webs of the crankshaft. In another embodiment, an eccentric shaft inside the connecting rod pin may be used to move the pin along a machined slot in one direction while a pre-loaded spring can bring the crankshaft pin back into its original position.

Figure 16:
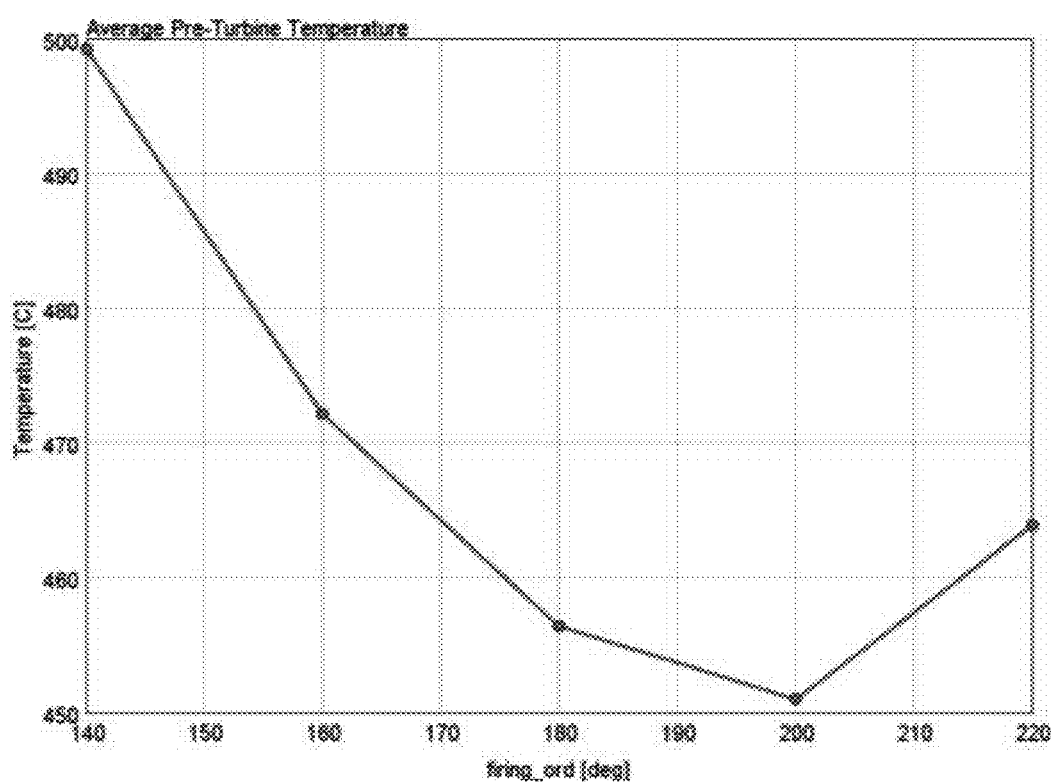
FIG. 16 illustrates pre-turbine exhaust gas temperatures for various dedicated exhaust gas recirculation cylinder crank pin offsets at constant engine torque of 70 Nm at 2000 rpm.

The degree of offset from the interval may be determined by the ECU based on the need for a certain level of exhaust gas recirculation. Generally, at stability limited conditions, such as low loads, the exhaust gas recirculation rate must be fully or partially reduced by means of the cold-start/EGR bleed-off/3-way valve 162, as shown in FIG. 16, owing to combustion instabilities. Without the dedicated exhaust gas recirculation cylinder(s) crankpin offsets, the dedicated exhaust gas recirculation cylinder(s) should not be run rich to ensure stoichiometric or near stoichiometric air-to-fuel ratios (AFR) upstream of the catalyst(s). And, as all cylinders operate at a stoichiometric air-fuel ratio (a lean air to fuel ratio may also be used provided appropriate after treatment is used, however stoichiometric is also preferable), $H_2$ production may be significantly reduced without rich in-cylinder reformation. This negatively impacts combustion as $H_2$ in recirculated exhaust gas provides relatively fast burn rates, ignitability, and stable combustion. In contrast, when a dedicated exhaust gas recirculation engine with a variable dedicated exhaust gas recirculation cylinder(s) crankpin offset is being used, the use of dedicated exhaust gas recirculation (that includes $H_2$ and CO) can be maintained, because it is possible to adjust the degree of offset to compensate for the reduction in rich operating conditions in the exhaust gas recirculation cylinder improving combustion performance over the use of a bleed-off valve. The same is true at peak load operation. Often it is desirable to reduce the exhaust gas recirculation rate along the lug curve to reduce the tax on the boosting system and increase load potential, and also enhance spark retard capability. Without being bound to any particular theory, it is noted that EGR mass flows impose challenges on boosting due to: the boosting system must handle an increase in total charge mass flow (air+EGR flow) if the power output should be maintained. This requires typically increased intake manifold pressures and thus compressor pressure ratios. If the EGR rate is decreases, the mass air flow can be increased accordingly which will lead to a greater torque and power potential. EGR causes a decrease in exhaust gas temperatures owing to the increased heat capacity and the possibility to operate the engine at a more advanced combustion phasing due to the knock resistance improvement. Lower exhaust gas temperature will decrease the enthalpy that is available to the turbine to power the compressor. Further, EGR decreases the ignitability of the mixture. In particular at high engine loads and high compression pressures it can be challenging for the ignition system to properly ignite the mixture. If the EGR rate is reduced, the mixture can be more easily ignited. Also, EGR slows down burn rates and tends to increase combustion instability which limits the amount of spark retard that can be tolerated. With less EGR, the combustion stability will be improved and more spark retard can be tolerated if required.

However, as with (partial) exhaust gas bleed-off at part loads, the air to fuel ratio in the dedicated exhaust gas recirculation cylinder(s) must be controlled to stoichiometric conditions to comply with future emissions legislations and reduce emissions and fuel consumption. Using the dedicated exhaust gas recirculation cylinder(s) crankpin offset mechanism, rich dedicated exhaust gas recirculation cylinder(s) combustion can be maintained which will benefit knock resistance and combustion stability at high loads.

Figure 17A:
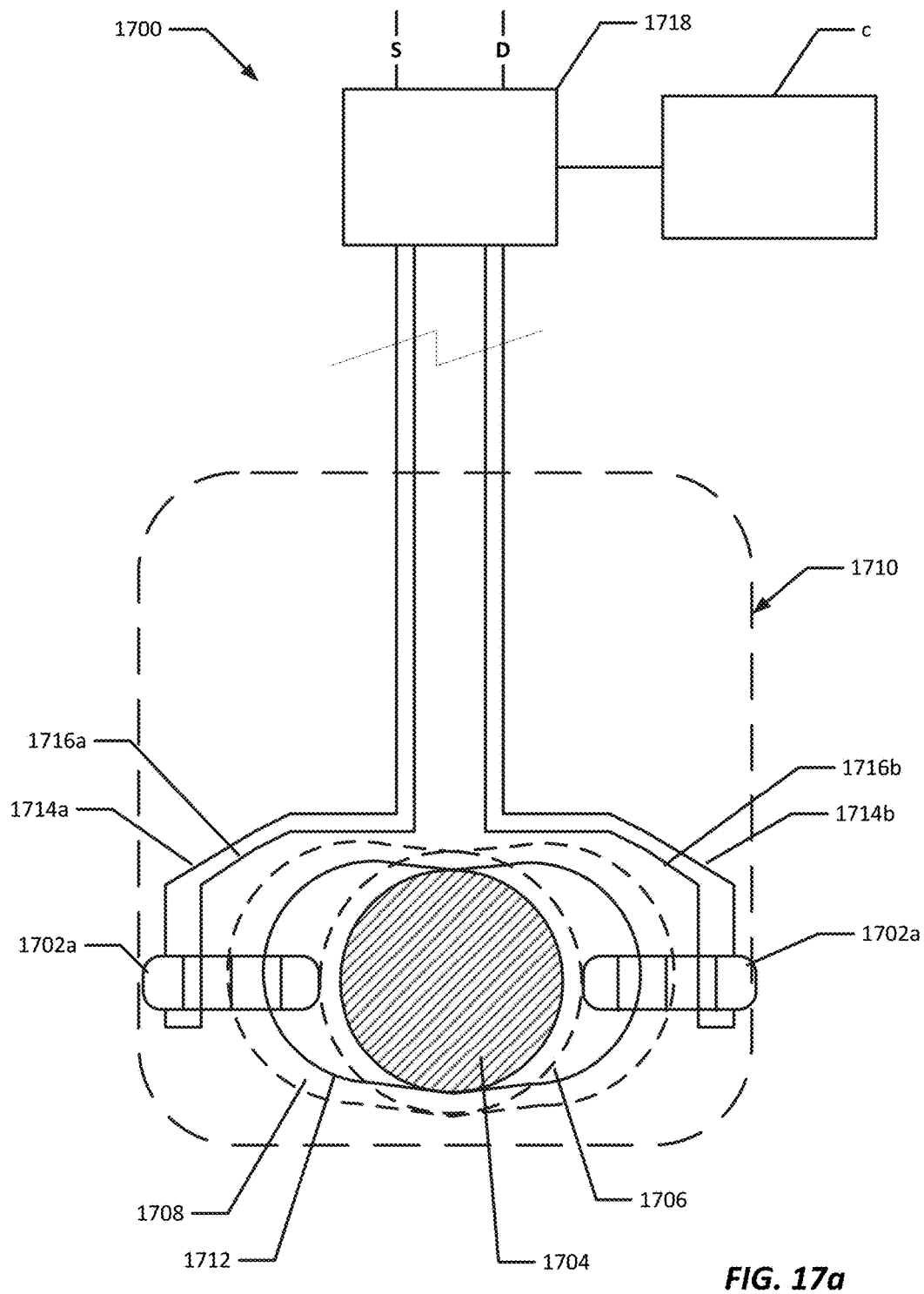
FIGS. 17a and 17b are illustrations of embodiments of an adjustable crankpin assembly.
Figure 17B:
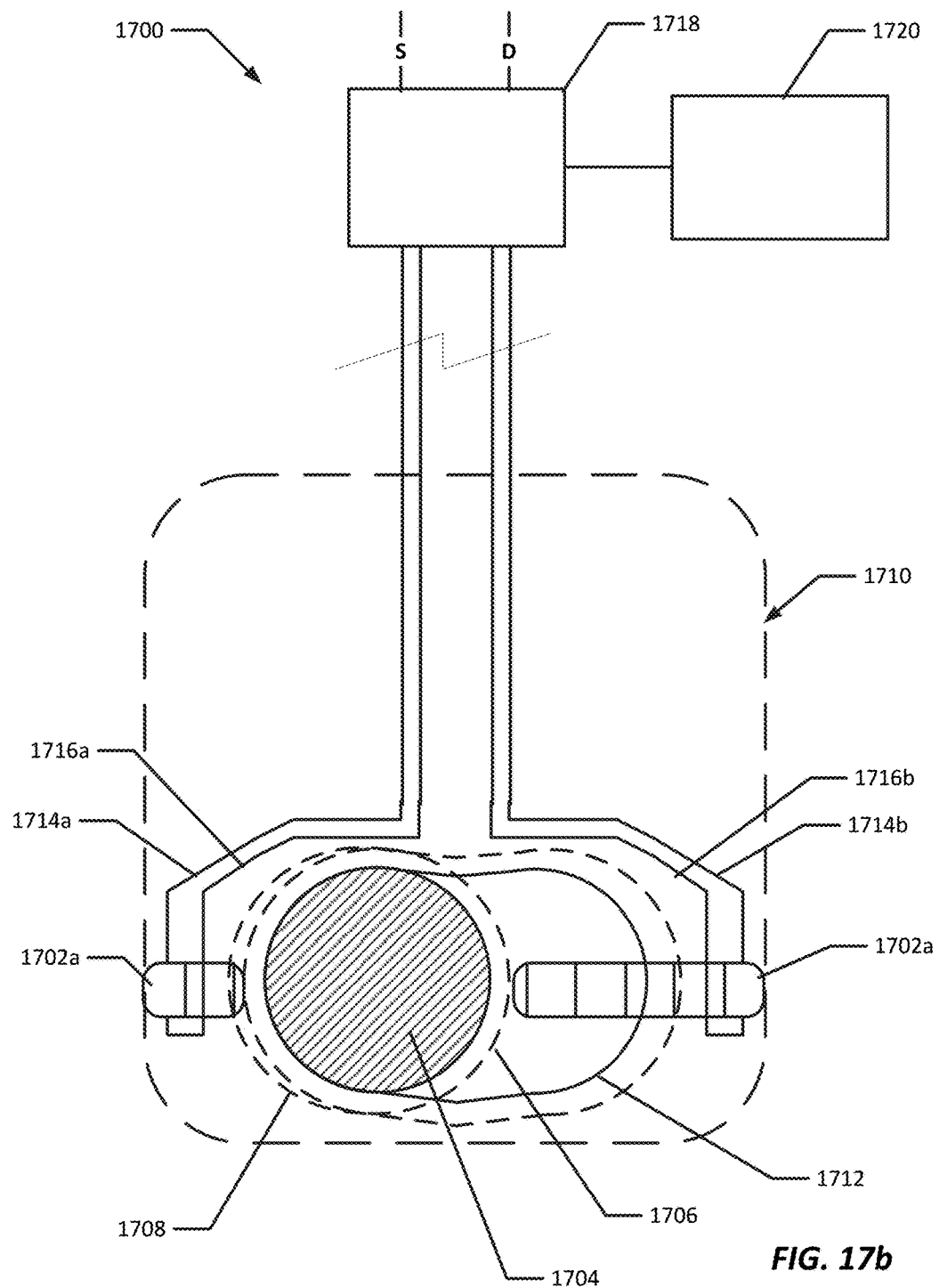

FIGS. 17a and 17b illustrate an embodiment of an adjustable crankpin assembly 1700. In this embodiment, the crankpin is offset with the use of actuators 1702a, 1702b, which are operatively coupled to the crankpin 1704 such that they may act on the crankpin to adjust the crankpin offset from the interval. In embodiments, this may include being directly coupled to the crankpin, and in such embodiments a single actuator may be employed. The crankpin 1704 may include a lip 1706 at the end of the crankpin 1704 that exhibits a slightly larger diameter than that of the crankpin itself. The lip 1706 may be slidably retained by a channel 1708 defined within the web 1710 of the crankshaft; the edge of the channel 1708 may define a slot 1712 through which the crankpin 1704 extends. The slot 1712 may be arcuate in shape. While two actuators are illustrated, only one actuator may be provided, or more than two actuators may be provided, such as 4 actuators, to direct the crankpin within the slot and channel.

As alluded to above, the actuators 1702a, 1702b may be activated with hydraulics or pneumatics, or may be electromechanical in nature. In the case of hydraulic or pneumatic actuators, fluid or gas may be provided to the actuators 1702a, 1702b, through supply lines 1714a, 1714b, 1716a, 1716b. The actuators may be single acting where each actuator includes a supply 1714a, 1714b and a drain line 1716a, 1716b, or double acting where the supply lines act as both supply and drain lines. Further, one or more control valves 1718 may be provided to direct the flow of the fluid or gas to and from the actuators. In addition, a fluid or gas supply line S and a fluid or gas drain line D may be provided to the control valve 1718. The control valve may be activated by the electronic control unit 1720 to which the control valve is operatively coupled. The actuators may be positioned within the crankshaft web extend into the channel and slot. Further, as illustrated, the actuators act again the crankpin lip; however the actuators may also act directly against the crankpin.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A four stroke internal combustion engine with dedicated exhaust gas recirculation, comprising:
a plurality of combustion cylinders including at least two main cylinders and a dedicated exhaust gas recirculation cylinder, wherein each cylinder includes a piston;
a crankshaft, which is rotatable in a direction and defines a main crankshaft axis, wherein said crankshaft includes a plurality of crankpins and each of said crankpins is coupled to at least one of said pistons, and
a) said crankpins affixed to said pistons of said main cylinders are spaced at an interval around said main crankshaft axis, and
b) said crankpin affixed to said piston of said dedicated exhaust gas recirculation cylinder is spaced at an offset of 5 to 20 degrees from said interval in either direction relative to the direction of crankshaft rotation around said main crankshaft axis,
wherein said plurality of combustion cylinders are configured to operate in a four-stroke cycle.

2. The internal combustion engine of claim 1, comprising three main cylinders and one dedicated exhaust cylinder, wherein said interval is 180 degrees.

3. The internal combustion engine of claim 1, comprising five main cylinders and one dedicated exhaust cylinder, wherein said interval is either 120 degrees or 60 degrees.

4. The internal combustion engine of claim 1, comprising four main cylinders and two dedicated exhaust cylinders, wherein said interval is either 120 degrees or 60 degrees.

5. The internal combustion engine of claim 1, wherein said crankpin associated with said dedicated exhaust cylinder exhibits a radial spacing that is closer to said main crankshaft axis relative to a radial spacing of said crankpins associated with said main cylinders from said main crankshaft axis.

6. The internal combustion engine of claim 1, wherein said crankpin associated with said dedicated exhaust cylinder exhibits a radial spacing that is further from said main crankshaft axis relative to a radial spacing of said crankpins associated with said main cylinders from said main crankshaft axis.

7. A method of operating a four-stroke internal combustion engine with dedicated exhaust gas recirculation, comprising:
combusting a fuel-air mixture in a four-stroke internal combustion engine, wherein said internal combustion engine includes
a plurality of combustion cylinders including at least two main cylinders and a dedicated exhaust gas recirculation cylinder, wherein each cylinder includes a piston, and
a crankshaft, which is rotatable in a direction of rotation and defines a main crankshaft axis,
wherein said crankshaft includes a plurality of crankpins and each of said crankpins is coupled to at least one of said pistons, and
a) said crankpins affixed to said pistons of said main cylinders are spaced at an interval around said main crankshaft axis, and
b) said crankpin affixed to said piston of said dedicated exhaust gas recirculation cylinder is spaced at an offset of 5 to 20 degrees from said interval in either direction relative to the direction of crankshaft rotation around said main crankshaft axis; and
rotating said crankshaft and said crankpins around said crankshaft in said direction of rotation, wherein said plurality of combustion cylinders are all operated with a four-stroke cycle.

8. The method of claim 7, wherein said fuel-air mixture of said main cylinders exhibits a first air to fuel ratio and said fuel-air mixture of said dedicated exhaust gas cylinder exhibits a second fuel to air ratio, wherein said first air to fuel ratio is different from said second fuel to air ratio.

9. The method of claim 7, wherein said internal combustion engine includes three main cylinders and one dedicated exhaust cylinder, wherein said interval is 180 degrees.

10. The method of claim 7, wherein said internal combustion engine includes five main cylinders and one dedicated exhaust cylinder, wherein said interval is either 120 degrees or 60 degrees.

11. The method of claim 7, wherein said internal combustion engine includes four main cylinders and two dedicated exhaust cylinders, wherein said interval is either 120 degrees or 60 degrees.

12. The method of claim 7, wherein said crankpin associated with said dedicated exhaust cylinder exhibits a radial spacing that is closer to said main crankshaft axis relative to a radial spacing of said crankpins associated with said main cylinders from said main crankshaft axis.

13. The method of claim 7, wherein said crankpin associated with said dedicated exhaust cylinder exhibits a radial spacing that is further from said main crankshaft axis relative to a radial spacing of said crankpins associated with said main cylinders from said main crankshaft axis.

14. The method of claim 7, further comprising exhausting a product of combustion of said fuel-air mixture and recirculating a portion of said exhaust to provide air to said fuel-air mixture.

* * * * *